United States Patent
Wen et al.

(10) Patent No.: US 11,809,517 B1
(45) Date of Patent: Nov. 7, 2023

(54) ADAPTIVE METHOD OF CLEANING STRUCTURAL HEALTH MONITORING DATA BASED ON LOCAL OUTLIER FACTOR

(71) Applicant: Southwest Jiaotong University, Chengdu (CN)

(72) Inventors: Zefeng Wen, Chengdu (CN); Qinglin Xie, Chengdu (CN); Gongquan Tao, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 18/123,234

(22) Filed: Mar. 17, 2023

(30) Foreign Application Priority Data

Sep. 21, 2022 (CN) ......................... 202211147791.1

(51) Int. Cl.
   G06F 17/18 (2006.01)
   G06F 17/10 (2006.01)
(52) U.S. Cl.
   CPC .............. G06F 17/18 (2013.01); G06F 17/10 (2013.01)
(58) Field of Classification Search
   CPC .................................................... G06F 16/215
   USPC ....................................................... 707/692
   See application file for complete search history.

(56) References Cited

U.S. PATENT DOCUMENTS

| | | | | |
|---|---|---|---|---|
| 7,818,131 B2 * | 10/2010 | Mott | ...................... | G16H 50/70 600/300 |
| 8,042,397 B2 * | 10/2011 | Ihn | ...................... | G01N 29/4427 73/602 |
| 8,548,786 B2 * | 10/2013 | Plenz | ..................... | G16H 30/20 703/11 |
| 8,831,911 B2 * | 9/2014 | Lipowsky | .......... | G05B 23/0254 702/182 |

(Continued)

FOREIGN PATENT DOCUMENTS

| CN | 109214355 A | | 1/2019 |
|---|---|---|---|
| CN | 111813766 A | * | 10/2020 |

(Continued)

OTHER PUBLICATIONS

"A Preliminary Method of Abnormal Pattern Recognition (APR) Based on Adaptive Slide Window (ASW) and Template Matching (TM)", Jinmei Zhong et al., "2021 17th International Conference on Computational Intelligence and Security (CIS)", pp. 479-483.

(Continued)

*Primary Examiner* — Hicham Skhoun
(74) *Attorney, Agent, or Firm* — Zhigang Ma (57) ABSTRACT

An adaptive method of cleaning structural health monitoring (SHM) data based on local outlier factor is provided, including following steps: step 1: dividing SHM data to be analyzed into a series of data segments by using adaptive sliding window (ASW) technology; step 2: extracting time-domain statistical factors and frequency-domain statistical factors of each of the data segments to refine data information, thereby forming objects for study; step 3: calculating an (Continued)

outlier degree of each of the objects by using a weighted multiscale local outlier factor (WMLOF) based on feature factors; and step 4: detecting anomalies in SHM data by comparing a WMLOF value with a threshold value. The adaptive method can improve data quality effectively.

3 Claims, 4 Drawing Sheets

(56) References Cited

U.S. PATENT DOCUMENTS

| | | | | |
|---|---|---|---|---|
| 8,838,215 | B2* | 9/2014 | John | A61B 5/349 |
| | | | | 607/18 |
| 9,218,232 | B2* | 12/2015 | Khalastchi | G06F 11/0754 |
| 9,514,436 | B2* | 12/2016 | Marci | H04N 21/252 |
| 9,728,014 | B2* | 8/2017 | Khalaschi | G07C 5/02 |
| 10,317,467 | B2* | 6/2019 | Seeley | G01R 31/343 |
| 10,333,958 | B2* | 6/2019 | Huang | H04L 43/04 |
| 10,701,092 | B2* | 6/2020 | Sartran | H04L 63/1416 |
| 10,826,932 | B2* | 11/2020 | Abbaszadeh | G06F 18/2163 |
| 10,885,146 | B2* | 1/2021 | Yi | G01M 5/0066 |
| 10,914,608 | B2* | 2/2021 | Chen | G06F 18/21375 |
| 11,147,480 | B2* | 10/2021 | Liu | G06N 20/00 |
| 11,475,981 | B2* | 10/2022 | Tell | G16B 20/40 |
| 11,487,280 | B2* | 11/2022 | Amemiya | B25J 9/1674 |

FOREIGN PATENT DOCUMENTS

| | | | | |
|---|---|---|---|---|
| CN | 113157674 | A * | 7/2021 | G06F 16/215 |
| CN | 113297195 | A * | 8/2021 | G06F 16/215 |

OTHER PUBLICATIONS

"The State Changes Analysis and Aging Predicition of High Voltage Remote Detection Module Based on Machine Learning", Zhu Chuwei, "Engineering Science and Technology II of China Excellent Master's Thesis Full-text Database", No. (2022) 03, C042-2437.

CNIPA, Notification of a First Office Action for CN202211147791.1, dated Nov. 1, 2022.

Southwest Jiaotong University (Applicant), Reply to Notification of a First Office Action for CN202211147791.1, w/ (allowed) replacement claims, dated Nov. 6, 2022.

CNIPA, Notification to grant patent right for invention in CN202211147791.1, dated Nov. 14, 2022.

* cited by examiner

ADAPTIVE METHOD OF CLEANING STRUCTURAL HEALTH MONITORING DATA BASED ON LOCAL OUTLIER FACTOR

TECHNICAL FIELD

The disclosure relates to the technical field of mechanical structure health monitoring and provides an adaptive method of cleaning structural health monitoring (SHM) data based on local outlier factor, in particular to a method of cleaning abnormal data based on adaptive sliding window (ASW) and weighted multiscale local outlier factor (WMLOF).

BACKGROUND

In the past two decades, the amount of data obtained and stored in mechanical system has increased continually, and the acquisition of massive data drives the SHM of mechanical equipment into the era of big data. The big data of mechanical equipment monitoring contains rich health status information, which brings new opportunities for mechanical equipment health monitoring. Meanwhile, due to the coupling interference of multiple factors in the process of data acquisition, transmission and storage, modern SHM data exhibits following five characteristics: high velocity; high variety; high volume; low value density; and low veracity. Therefore, it is significantly more difficult to extract the health status information of the mechanical equipment. On the one hand, the traditional signal processing technology has become more and more inapplicable for a complex data set, it is even powerless in the research of data-driven mechanical fault diagnosis. On the other hand, intelligent diagnosis methods based on machine learning technology have gradually become popular research in recent years. Many scholars have proposed various algorithmic models based on machine learning, and have made a series of achievements in fault diagnosis of rolling bearings, wind turbines, gearboxes, motors, etc.

Driven by big data, although the methods based on machine learning have some incomparable advantages in SHM of mechanical systems, many problems remain to be solved, among which data quality is the key. Algorithms based on machine learning and deep learning cannot evaluate the data quality, and present the disadvantage of "garbage in, garbage out". The results obtained based on such low-quality SHM data may be incorrect or even misleading. Therefore, it is necessary to carry out researches on SHM data quality assurance method to achieve efficient and accurate mechanical SHM. To examine data quality comprehensively and systematically, the characteristics of data should be analyzed first. In general, characteristics of the data quality can be summarized as data accuracy, data timeliness, data consistency and data completeness. In the implementation process of engineering, the service environment of mechanical equipment is usually very harsh. As such, the equipment is vulnerable to random interference factors, which consequently results in abnormal SHM data and reduces the data accuracy; the data timeliness refers to whether the update status of data is the latest, and network interruption or transmission failure will reduce the data timeliness of SHM data; the data consistency refers to the consistency of data format and data structure, if data from multiple physical sources are directly stacked for storage without any classification or preprocessing, and the data consistency will be greatly reduced. The data completeness refers to the continuity of data, due to the failures of data acquisition equipment, such as the failures of sensor and the failures of central processing unit (CPU) of data acquisition system, some data may be missing, and thus reducing the data completeness. Based on the definition of data quality, missing data and drifting data are typical issues of incomplete and inaccurate data. There is no doubt that the anomaly of SHM data will directly affect the result of fault diagnosis. Detection and elimination of these abnormal data can greatly improve the data quality and produce more reliable SHM results. Although there are many researches on SHM models and algorithms, there are few researches on the SHM data quality assurance methods as the basis of data-driven fault diagnosis. Therefore, it is necessary to focus on the researches related to the data quality assurance methods.

SUMMARY

The disclosure provides an adaptive method of cleaning SHM data based on local outlier factor, which can overcome some shortcomings of the prior art.

The adaptive method of cleaning SHM data based on local outlier factor provided by the disclosure includes following steps:
  step 1: dividing SHM data to be analyzed into a series of data segments by using adaptive sliding window (ASW) technology;
  step 2: extracting time-domain statistical factors and frequency-domain statistical factors of each of the data segments to refine data information, thereby forming objects for study;
  step 3: calculating an outlier degree of each of the objects by using a weighted multiscale local outlier factor (WMLOF) based on feature factors; and
  step 4: detecting anomalies in the SHM data by comparing a WMLOF value of each of the objects with a threshold value.

In an embodiment, specific steps of the step 1 are as follows:
  1) dividing the SHM data to be analyzed by using a sliding window of mini-length W, and a value of the mini-length W being associated with a length of a signal to be analyzed;
  2) calculating a variance value of each of the data segments divided by the sliding window of the mini-length W;
  3) taking a mean value V of the variance values of the data segments as the threshold value, where V=mean ($Var_1$, $Var_2$, ..., $Var_n$), mean represents an average operation, n represents a number of the data segments, and Van represents the variance value;
  4) comparing the variance value of each of the data segments with the threshold value, and taking variance value features adjacent to the threshold value as anchor points of ASWs, wherein the variance value features correspond to an abnormal data development region $R_{in}$ and an abnormal data decline region $R_{out}$ respectively; and
  5) combining the anchor points of the ASWs in pairs to generate specific ASWs with different sizes, where data outside the abnormal data development region $R_{in}$ and the abnormal data decline region $R_{out}$ is regarded as normal data with a same attribute.

In an embodiment, the adaptive method further includes: eliminating data corresponding to the anomalies from the SHM data to obtain target SHM data, thereby performing fault diagnosis on mechanical equipment corresponding to the SHM data based on the target SHM data.

In an embodiment, in the step 2, the time-domain statistical factors and the frequency-domain statistical factors include the feature factors, the features factors include: absolute mean, variance, standard deviation, kurtosis, skewness, root mean square, shape factor, peak factor, impulse factor, margin factor, kurtosis factor, clearance factor and mean frequency; and the feature factors are recombined to form low-latitude sample objects.

In an embodiment, in the step 3, the WMLOF is used to determine weights of local outlier factor (LOF) values under different nearest neighbors k, an entropy weight method (EWM) is used to perform weighting, and steps to calculate the weights in the EWM are as follows:

step (i): determining evaluation objects; wherein an evaluation object matrix is shown in a following formula, each row and column of the evaluation object matrix DT respectively represent one of the evaluation objects and a LOF original feature corresponding to the evaluation object; in the evaluation object matrix DT, [p=1, 2, . . . , n; k=$k_{min}$, $k_{min+1}$, . . . , $k_{max-1}$, $k_{max}$]; n represents a number of the evaluation objects; k∈[$k_{min}$, $k_{max}$], $k_{min}$ and $k_{max}$ are 5 and 20 respectively;

$$DT = \begin{bmatrix} q_{1k_{min}} & q_{1k_{min}+1} & \cdots & q_{1k_{max}-1} & q_{1k_{max}} \\ q_{2k_{min}} & q_{2k_{min}+1} & \cdots & q_{2k_{max}-1} & q_{2k_{max}} \\ \cdots & \cdots & \cdots & \cdots & \cdots \\ q_{pk_{min}} & q_{pk_{min}+1} & \cdots & q_{pk_{max}-1} & q_{pk_{max}} \\ \cdots & \cdots & \cdots & \cdots & \cdots \\ q_{nk_{min}} & q_{nk_{min}+1} & \cdots & q_{nk_{max}-1} & q_{nk_{max}} \end{bmatrix}$$

where q represents each of the evaluation objects, p represents a row number, and k represents a column number;

step (ii): using normalization of indexes to normalize heterogeneous indexes; that is, converting absolute values of the indexes into relative values, so as to solve a problem of homogenization of the heterogeneous indexes; using a linear normalization technique to render dataset of the evaluation object matrix DT dimensionless, thereby obtaining a $NDM_{pk}$ matrix through a following formula:

$$NDM_{pk} = \frac{q_{pk} - \text{Min}(q_k)}{\text{Max}(q_k) - \text{Min}(q_k)}$$

where $q_{pk}$ represents data in a p-th row and a k-th column of the evaluation object matrix DT, and $q_k$ represents data in the k-th column of the evaluation object matrix DT;

step (iii): obtaining an occurrence probability of a response $Pr_{pk}$ and calculating an entropy value of the response $Pr_{pk}$ by following formulas:

$$Pr_{pk} = \frac{NDM_{pk}}{\sum_{p=1}^{n} NDM_{pk}}$$

$$En_k = -\frac{1}{\log_e(n)} \sum_{p=1}^{n} Pr_{pk} \log_e(Pr_{pk})$$

where $En_k$ represents the entropy value, and e represents a natural constant;

step (iv): calculating an information entropy redundancy $Div_k$ of each the response $Pr_{pk}$ and an entropy weight value $Ew_k$ of the information entropy redundancy $Div_k$ by following formulas;

$$Div_k = |1 - En_k|$$

$$Ew_k = \frac{Div_k}{\sum_{k_{min}}^{k_{max}} Div_k}$$

where LOF results of each sample under the different nearest neighbors k are regarded as responses of different samples, and WMLOF of an object p is obtained by a following formula:

$$WMLOF_p = 100 \times Ew(NDM_p)^T$$

Ew is a row vector and represents an entropy weight value, and $(NDM_p)^T$ is a column vector. NDM represents a normalized DT.

The beneficial effects of the disclosure are as follows:
1) The disclosure provides a new ASW method suitable for SHM data. The ASW method ingeniously solves the problems of data leakage and data redundancy caused by a sliding window with an invariable length. The overall SHM data to be analyzed can be divided optimally into a series of data segments by the ASW.
2) A WMLOF method based on the entropy weight theory is provided to improve the shortages of the LOF method. Based on the intelligent weighting and integration of results including the nearest neighbor "k" at different scales, the WMLOF method can adaptively extract LOF features at different scales.
3) The SHM anomaly data detection method based on ASW and WMLOF strategy is established to expand the practical application of the outlier detection in SHM data.

DETAILED DESCRIPTION OF EMBODIMENTS

In order to further understand the content of the disclosure, the disclosure is described in detail in combination with the drawings and embodiments. It should be understood that the embodiment is only an explanation of the disclosure, not a limitation.

Embodiment

Figure 1:
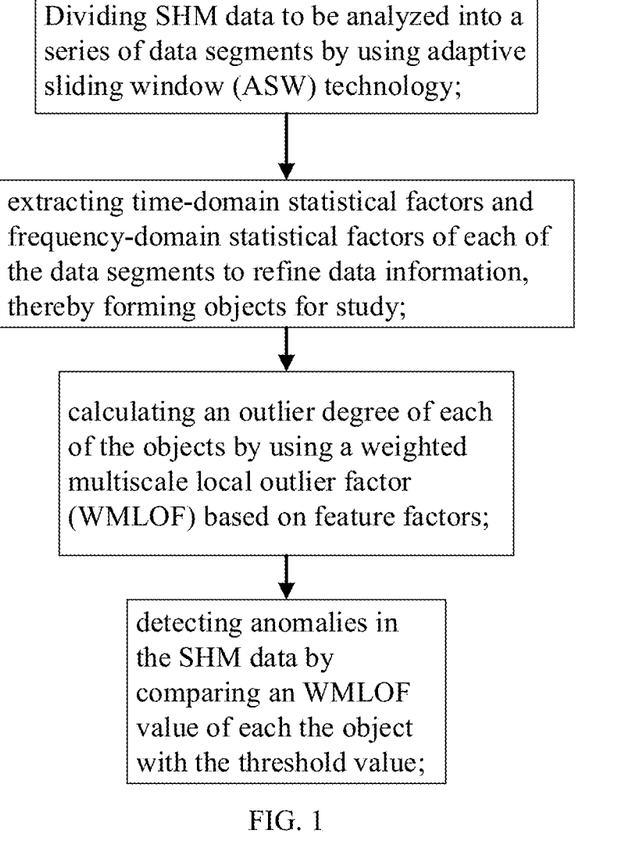
FIG. 1 is a flow chart of an adaptive method of cleaning SHM data based on local outlier factor in an embodiment.

As shown in FIG. 1, an adaptive method of cleaning structural health monitoring (SHM) data based on local outlier factor is provided in the embodiment, and the adaptive method includes:

step 1: dividing SHM data to be analyzed into a series of data segments by using adaptive sliding window (ASW) technology;

step 2: extracting time-domain statistical factors and frequency-domain statistical factors of each of the data segments to refine data information, thereby forming objects for study;

step 3: calculating an outlier degree (i.e., WMLOF value) of each of the objects by using a weighted multiscale local outlier factor (WMLOF) based on feature factors; and step 4: detecting anomalies in the SHM data by comparing the WMLOF value of each object with a threshold value.

Adaptive Sliding Dividing of SHM Data

Figure 2:
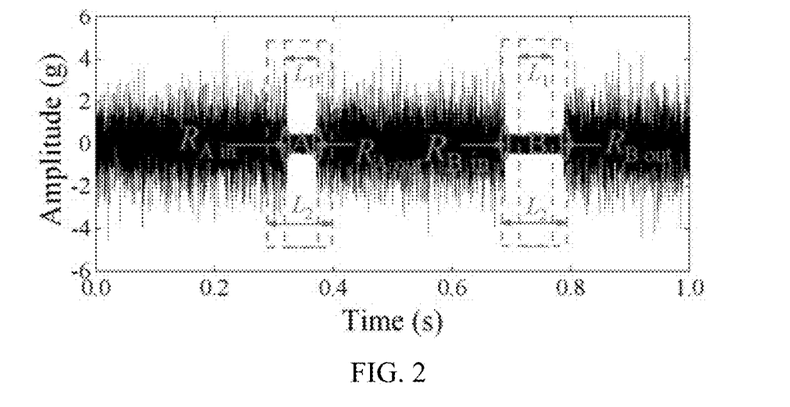
FIG. 2 is a schematic diagram of data leakage and data redundancy in an embodiment.

SHM data of Modern mechanical equipment are typically large in volume, and valuable features of the SHM data are difficult to obtain by direct analysis. Therefore, a sliding window technology is used in this embodiment. First, the entire dataset is divided into a series of data segments (also can be short as segments) by a sliding window, which is helpful to target analysis and to improve the computational efficiency. Generally, the dataset is divided by a sliding window with an invariable length. However, the sliding window with an invariable length often results in two non-negligible problems: data leakage and data redundancy as shown in FIG. 2. A sliding window with a length of L1 can effectively identify region A, but the sliding window with the length of L1 cannot completely include region B. A portion of data with the same attributes in region B is not included in the sliding window L1 (i.e., the sliding window with the length of L1), which implies data leakage. Conversely, a sliding window with a length of L2 can identify region B accurately. However, an over-inclusion occurs in region A. Some characteristics that do not belong to region A are summarised together by the sliding window with the length of L2, which implies data redundancy. Therefore, the data leakage and data redundancy are primary issues to be addressed. A sliding window with an adaptive length can be considered to solve the shortcomings of the sliding window with an invariable length.

The ASW involves the generation of sliding windows of different lengths for different types of data. In the embodiment, an ASW strategy is proposed to determine the sliding window size based on the attribute variation of data. In the SHM data, two important characteristics are observed when the data attributes change. Firstly, the SHM data containing a section of abnormal data must include two inflection regions, i.e. the intersection of normal data to abnormal data and the intersection of abnormal data to normal data, and the two inflection regions are known as the abnormal data development region (also referred to as an entry region) $R_{in}$ and abnormal data decline region (also referred to as an exit region) $R_{out}$ respectively as shown in FIG. 2. Secondly, the generation mechanism of abnormal data is different from normal data. Therefore, the deviation degree of the random variable in normal and abnormal data from its corresponding mathematical expectation (i.e. the variance), will likely be different, particularly in $R_{in}$ and $R_{out}$. Based on the observation and analysis above, the ASW strategy is proposed. The specific steps are as follows:

1) Original SHM data to be analyzed is divided into data segments by a sliding window with a length W. The value of W is associated with the length (sampling frequency×sampling time) of the signal to be analyzed. It is recommended that a ratio of the length of W to the length of the original SHM data is in a range of 1/200 to 1/100 to ensure detection accuracy and efficiency.

2) Variance values of each of the data segments divided by the sliding window with the length W are calculated.

3) A mean value V of the variance values of the data segments is taken as a threshold value. Specifically, V=mean (Var$_1$, Var$_2$, Var$_n$), where mean represents an average operation, n represents a number of the data segments, and Van represents the variance value.

Figure 9:
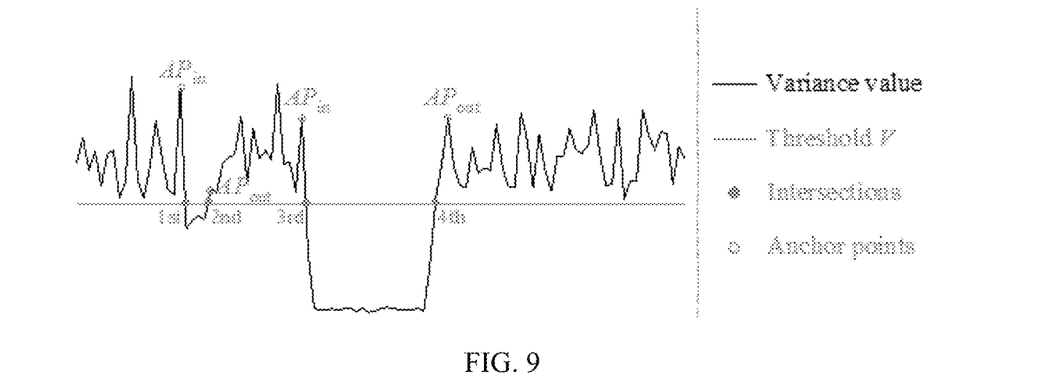
FIG. 9 is a schematic diagram of a result after comparing variance values with a threshold value.

4) As shown in FIG. 9, each of the variance values is compared with the threshold value (i.e., the mean value V), and variance value features adjacent to the threshold value are taken as anchor points of ASWs, the variance value features correspond to the abnormal data development region $R_{in}$ and the abnormal data decline region $R_{out}$, respectively. The above contents can be understood as: the variance value of each segment is compared with the threshold value (i.e., the mean value V) to obtain several intersection points. The first point ($AP_{in}$ as shown in FIG. 9) on the left of each odd intersection point is considered as an anchor point and the first point ($AP_{out}$ as shown in FIG. 9) on the right of each even intersection point as another anchor point, so as to obtain a series of anchor points for the ASWs.

5) The obtained anchor points are combined in pairs to generate specific ASWs with different sizes, data outside the entry region $R_{in}$ and the exit region $R_{out}$ (also can be understood as data outside the $AP_{in}$ and $AP_{out}$ groups) can be regarded as normal data with a same attribute.

Feature Factors Extraction from Each of the Data Segments

It is beneficial to extract the time-domain statistical factors and frequency-domain statistical factors in each of the divided data segments to refine the data information and reduce the data dimensions. The above mentioned factors (i.e., the time-domain statistical factors and frequency-domain statistical factors) include the absolute mean, variance, standard deviation, kurtosis, skewness, root mean square, shape factor, peak factor, impulse factor, margin factor, kurtosis factor, clearance factor and mean frequency. These statistical features were selected since they are widely used in SHM study and can effectively describe the characteristics of the SHM data. It is noted that not the more feature factors are, the effect is better. It is more important to select feature factors that can condense the information of the SHM data to the maximum. Otherwise, the calculation burden will increase, which may result in other adverse effects.

Outlier Degree Calculation Based on the WMLOF

The outlier degree of each object can be calculated based on basic theory of the LOF.

The core idea of the WMLOF method is to determine the appropriate weights for LOF values of the nearest neighbor "k" at different scales. Compared with other weighting methods, the entropy weight method (EWM) is simple in terms of calculation and obviates the necessity of considering the subjective preference. It only requires objective data to calculate the weight. Furthermore, the EWM is a typical diversity-based weighting method that calculates attribute weights based on the diversity of attribute data among the alternatives. Specific steps to calculate objective weights in the EWM are as follows:

first step: determining evaluation objects; where an evaluation object matrix is shown in a following formula, each row and column of the evaluation object matrix DT respectively represent one of the evaluation objects and a LOF original feature corresponding to the evaluation object; in the evaluation object matrix DT, [p=1, 2, ..., n; k=$k_{min}$, $k_{min+1}$, ..., $k_{max-1}$, $k_{max}$]; n represents a number of the evaluation objects; k∈[$k_{min}$, $k_{max}$], $k_{min}$ and $k_{max}$ are set as 5 and 20 respectively;

$$DT = \begin{bmatrix} q_{1k_{min}} & q_{1k_{min}+1} & \cdots & q_{1k_{max}-1} & q_{1k_{max}} \\ q_{2k_{min}} & q_{2k_{min}+1} & \cdots & q_{2k_{max}-1} & q_{2k_{max}} \\ \cdots & \cdots & \cdots & \cdots & \cdots \\ q_{pk_{min}} & q_{pk_{min}+1} & \cdots & q_{pk_{max}-1} & q_{pk_{max}} \\ \cdots & \cdots & \cdots & \cdots & \cdots \\ q_{nk_{min}} & q_{nk_{min}+1} & \cdots & q_{nk_{max}-1} & q_{nk_{max}} \end{bmatrix}$$

where q represents each of the evaluation objects, p represents a row number, and k represents a column number (the nearest neighbor);

second step: using normalization of indexes to normalize heterogeneous indexes. Since the measurement units of various indicators are not uniform, standardization should be carried out before using them to calculate comprehensive indexes, that is, absolute values of the indexes are converted into relative values, so as to solve a problem of homogenization of the heterogeneous indexes; a linear normalization technique is used to render dataset of the evaluation object matrix DT dimensionless, which can effectively reduce errors caused by dimension or magnitude when analyzing different responses from different samples. The formula of the steps of the normalization is as follows:

$$NDM_{pk} = \frac{q_{pk} - \mathrm{Min}(q_k)}{\mathrm{Max}(q_k) - \mathrm{Min}(q_k)}$$

where $NDM_{pk}$ represents a new matrix obtained by normalized the DT matrix, $q_{pk}$ represents data in a p-th row and a k-th column of the DT matrix, and $q_k$ represents data in the k-th column of the DT matrix.

third step: obtaining an occurrence probability of a response $Pr_{pk}$ and calculating an entropy value of the response $Pr_{pk}$ by following formulas:

$$Pr_{pk} = \frac{NDM_{pk}}{\sum_{p=1}^{n} NDM_{pk}}$$

$$En_k = -\frac{1}{\log_e(n)} \sum_{p=1}^{n} Pr_{pk} \log_e(Pr_{pk})$$

where the $En_k$ represents the entropy value, and the e represents a natural logarithm;

forth step: calculating an information entropy redundancy $Div_k$ of each the response $Pr_{pk}$ and an entropy weight value $Ew_k$ of the information entropy redundancy $Div_k$ by following formulas;

$$Div_k = |1 - En_k|$$

$$Ew_k = \frac{Div_k}{\sum_{k_{min}}^{k_{max}} Div_k}$$

The EWM for weight computation debilitates the weak impact of some atypical attributes and yields progressively precise and sensible assessments. Therefore, the LOF results of each sample under different nearest neighbors k are regarded as the responses of different samples. The WMLOF value of an object p can be obtained by this formula:

$$WMLOF_p = 100 \times Ew(NDM_p)^T$$

This equation is used to describe the WMLOF value of the object p, where the $WMLOF_p$ is a scalar, Ew is a row vector and represents an entropy weight value, and $(NDM_p)^T$ is a column vector. NDM represents a normalized DT. The purpose of multiplying by 100 is to enable a more intuitive understanding of the WMLOF characteristics.

Simulation Validation

Figure 3:
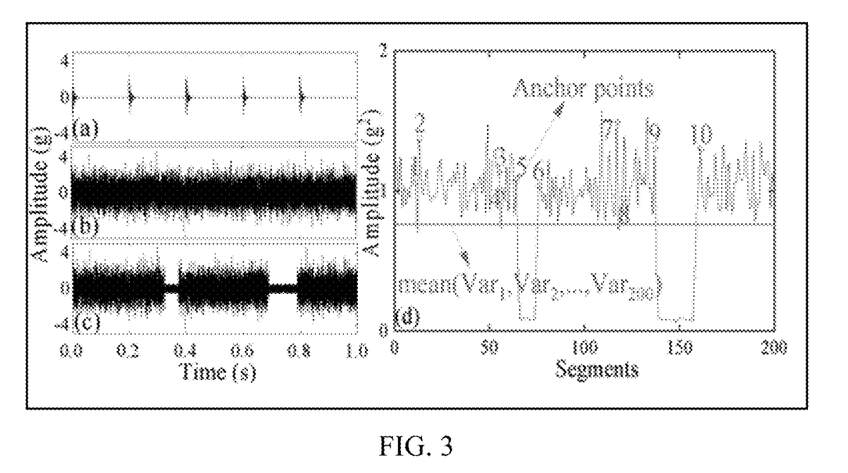
FIG. 3 is a simulation diagram of the missing vibration data generated by the faulty rolling bearing in an embodiment.

To verify the effectiveness of the ASW strategy, a synthetic simulation of missing vibration data generated by a faulty rolling bearing was conducted. A remarkable feature of a faulty rolling bearing is periodic impulses, which are expressed as:

$$y(t) = y_0 e^{-\xi \omega_n t} \sin \omega_n \sqrt{1 - \xi^2} t$$

where $y_0$ is the amplitude of the fault impulse ($y_0$=3), ξ represents the damping coefficient (ξ=0.1), $\omega_n$ represents the natural frequency of the rolling bearing, and $f_{re}$ represents the resonance frequency corresponding to the fault impulse ($f_{re}$=3,000 Hz). Additionally, the frequency of fault characteristic fθ was set to 100 Hz, the sampling frequency fs was 20,000 Hz, and the number of sampling points was 20,000. The diagram (a) of FIG. 3 depicts the simulated impulse signal partially. The data shown in the diagram (b) of FIG. 3 was obtained by adding Gaussian white noise, and the signal-to-noise ratio of the synthetic signal was zero. The diagram (c) of FIG. 3 exhibits two missing segments, which were created by replacing the original data from 0.322 seconds (s) to 0.372 s and 0.689 s to 0.789 s with Gaussian white noise. In this regards, the proposed abnormal data detection method based on the ASW and WMLOF strategies is applied to detect the anomaly (i.e. data missing). The results are shown in the diagram (d) of FIG. 3 and FIG. 4. Based on the principle of the ASW strategy, W was set to 100 to obtain the anchor points. The acquired anchor points 1 & 2, 3 & 4, 5 & 6, 7 & 8, and 9 & 10 generated five different sliding windows, respectively. In fact, it is sufficient to determine the ASWs based on anchor points 5 & 6 and 9 & 10. The sliding windows generated by anchor points 1 & 2, 3 & 4 and 7 & 8 are by-products of the ASW. The data attributes of the above sliding windows are consistent with the normal data. Therefore, treating these sliding windows as individual objects does not affect the subsequent WMLOF calculation.

Figure 4:
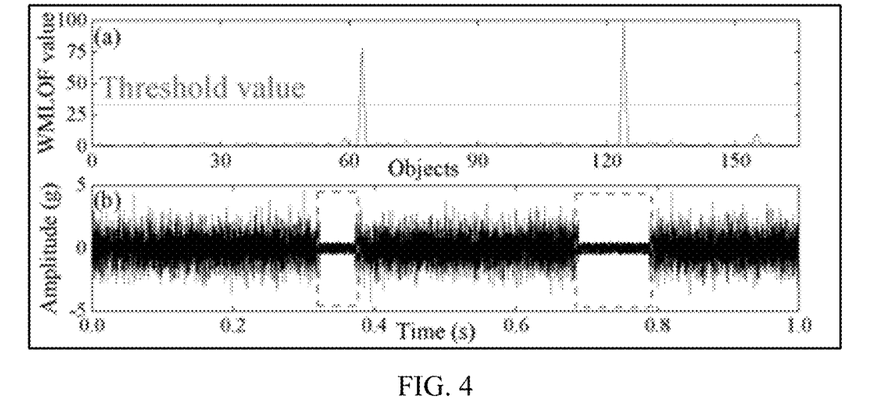
FIG. 4 is a schematic diagram of abnormal data detection based on ASW and WMLOF in an embodiment.
Figure 5:
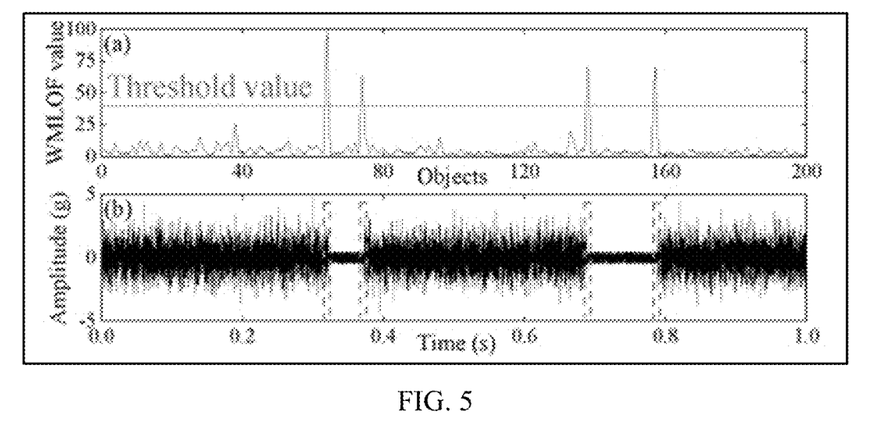
FIG. 5 is a schematic diagram of the abnormal data detection based on short length sliding window in an embodiment.

As shown in the diagram (a) of FIG. 4, two larger WMLOF values corresponding to the sliding windows generated by anchor points 5 & 6 and 9 & 10 (in the diagram (d) of FIG. 3) were indicated. By contrast, the WMLOF values of the normal data were small and the variation is mild. This indicated that the WMLOF values can be used to effectively distinguish between normal and abnormal objects. The corresponding detected missing data were denoted with a red dotted rectangle, as depicted in the diagram (b) of FIG. 4. It is clear that two segments with missing data and different sizes were successfully detected based on the proposed ASW and WMLOF strategies. Besides, the WMLOF values were calculated based on several invariable length of sliding windows to illustrate the disadvantages of the conventional sliding windows and the advantages of the ASW strategy. As shown in diagram (a) and diagram (b) of FIG. 5, the invariable window length was set to 100. The primary missing data were not detected except the data at both ends of the abnormal missing segments, this indicates that a small sliding window can result in data leakage, so that the anomaly cannot be detected completely. Consequently, the WMLOF values at both ends of the missing segments were higher than the threshold value, whereas the WMLOF values of most missing data were lower than the threshold value, which resulted in the improper detection of the missing data.

Figure 6:
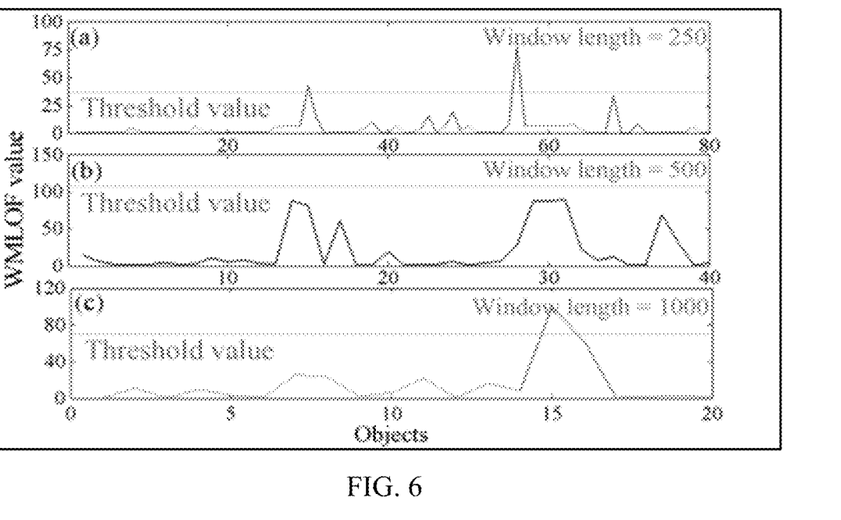
FIG. 6 is a schematic diagram of the abnormal data detection based on large sliding windows and WMLOF in an embodiment.

In addition, the small sliding window with an invariable length cannot detect abnormal data normally, and the large sliding window with an invariable length also cannot achieve satisfactory results. Diagrams (a), (b), and (c) of FIG. 6 show WMLOF values of each object under sliding windows with lengths of 250, 500, and 1000 respectively. None of the three lengths can correctly detect the missing data since the sliding window lengths cannot be changed adaptively based on the data attributes. Therefore, a sliding window with an invariable length cannot adapt to different scales of abnormal data. The sliding window with a small window length cannot completely contain the abnormal data, but it can only detect the ends of the abnormal segment. Conversely, the sliding window with a larger length mixes the anomaly with the normal data, this is not conducive to correctly distinguishing the differences in attributes between the normal and abnormal SHM data. By comparing FIG. 4, FIG. 5, and FIG. 6, it can be intuitively observed that the proposed ASW strategy has stronger adaptive analysis ability than the conventional sliding windows. The ASW can still maintain its validity when processing multiple abnormal data of different scales, which is very important for efficient processing of complex SHM data.

Engineering Application

Anomaly Detection of Measurement Gearbox Data

Figure 7:
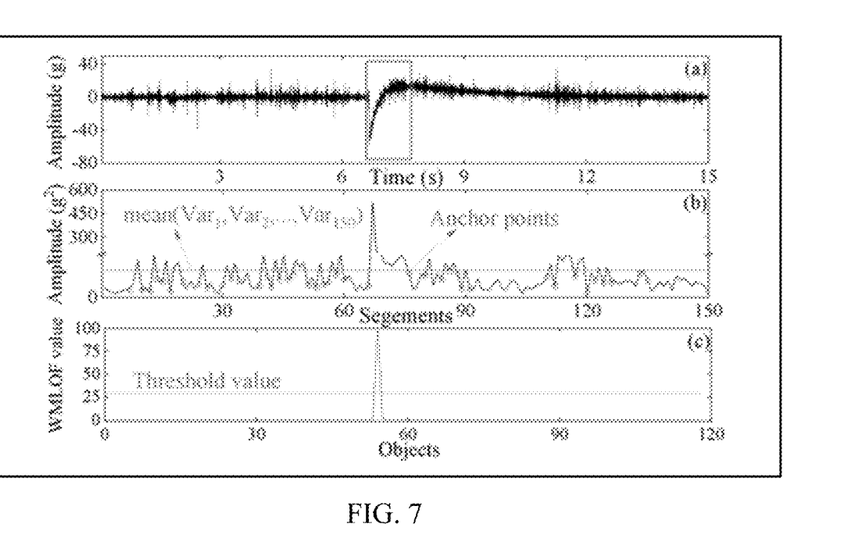
FIG. 7 is a schematic diagram of abnormal drift data detection based on the ASW and WMLOF in an embodiment.

Measurement data obtained from the gearbox of a railway vehicle were investigated to illustrate the practicability and universality of the proposed method. An accelerometer was installed on the gearbox, and the sampling frequency was 10,000 Hz. The railway vehicle is likely to be affected by wheel-rail irregularities when it moves on an actual rail, which results in significant vibration responses of the vehicle components. The diagram (a) of FIG. 7 shows case of data drift caused by sensor failure or connector damage. This anomaly often occurs in the measurement SHM data. The abnormal data must be detected to improve the data quality so that the physical information in the SHM data can be extracted accurately. Then the method of the disclosure was used to process the gearbox data. Additionally, W (i.e., a length of the sliding window) was set to 1,000. The anchor points of the gearbox vibration data obtained based on the ASW strategy are shown in the diagram (b) of FIG. 7. The diagram (c) of FIG. 7 depicts the degree of exception of each object based on the WMLOF method. The WMLOF value of one of ASWs is significantly greater than the threshold value, which corresponds to the rectangular box shown in the diagram (a) of FIG. 7, which proves that this method can accurately detect the abnormal drift segment. The above further shows that the ASW strategy and WMLOF method proposed in this embodiment are not only applicable to the abnormal missing phenomenon in SHM data, but also can effectively detect the drifting data.

Anomaly Detection of Bench Test Data

Figure 8:
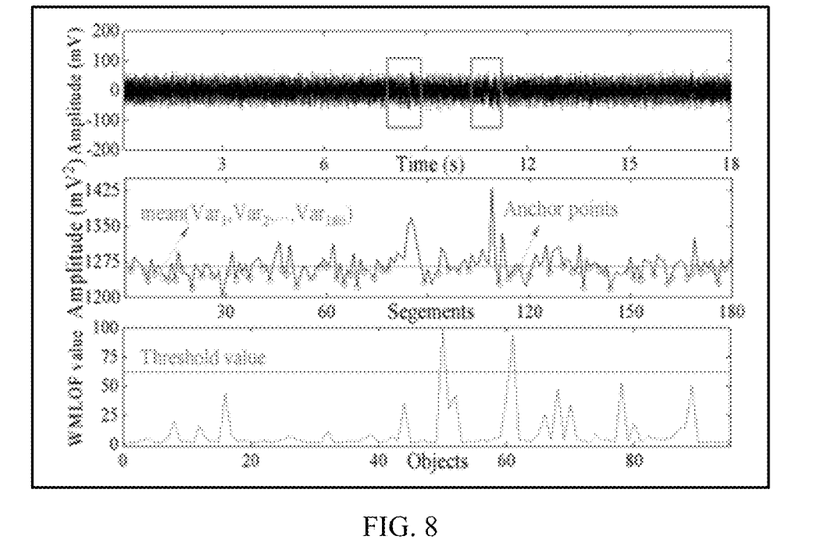
FIG. 8 is a schematic diagram of abnormal data detection based on the ASW and WMLOF in an embodiment.

The proposed method of the disclosure was further validated by using the displacement data from a bench test. The displacement data of the specimen was measured by a laser displacement sensor. The sampling frequency was 5,000 Hz. The diagram (a) of FIG. 8 shows the original voltage waveform measured by the laser displacement sensor. During the experiment, the disturbance was introduced to generate the abnormal data during 7 to 12 s by touching the sensor, and it is difficult to distinguish the disturbances directly from the original data. The ASW and WMLOF were applied to detect the abnormal data, the length W in the ASW was set to 500, and obtained anchor points as shown in the diagram (b) of FIG. 8. The diagram (c) of FIG. 8 shows detected abnormal segments according to WMLOF values. The abnormal data detection results were indicated by rectangles as shown in the diagram (a) of FIG. 8. It can be seen that the displacement data measured by the laser displacement sensor during 7.8 s to 8.8 s and 10.2 s to 11.1 s are abnormal data, which is consistent with expectations. The results show that the proposed method of the disclosure can achieve good performance in detecting abnormal SHM data, even if these abnormal data are very slight or even invisible to the naked eye.

CONCLUSIONS

To improve data qualities, the embodiments develops a new abnormal SHM data detection method including ASW and WMLOF. Firstly, the ASW is proposed to avoid data leakage and redundancy caused by a sliding window with an invariable length and obtain a series of optimal divided data segments. Then, the WMLOF is used to extract the outlier features of the data segments obtained by the ASW and evaluate the anomaly of the data segments since the effectiveness of the WMLOF in assessing and fusing the LOF characteristics at multiple scales. The actual simulation data of the faulty rolling bearing and measurement data collected from the railway vehicle gearbox and bench test are used to evaluate the availability of the proposed method of the disclosure. The results demonstrate that the proposed abnormal data detection method based on the ASW and WMLOF strategies can achieve good performance in detecting the typical anomalies of data missing and drift even the anomaly degree is very weak.

The above descriptions to the disclosure and implementation modes are schematic and should not be limited. What shown in the attached drawings is only one of the implementation modes of the disclosure, and the actual structure is not limited to this. Therefore, without deviating from the purpose of the disclosure, the structures and embodiments similar to the technical solution designed without creativity proposed by those ordinary skilled in the art inspired by the disclosure should fall within the protection scope of the disclosure.

What is claimed is:

1. An adaptive method of cleaning structural health monitoring (SHM) data based on local outlier factor, comprising:

step 1: dividing SHM data to be analyzed into a series of data segments by using adaptive sliding window (ASW) technology;
wherein the step 1 comprises:
1) Dividing the SHM data to be analyzed by using a sliding window of mini-length W, and a value of the mini-length W being associated with a length of a signal to be analyzed; wherein a ratio of the mini-length of W to a length of the SHM data to be analyzed is in a range of 1/200 to 1/100;
2) Calculating a variance value of each of the data segments divided by the sliding window of the mini-length W;
3) Averaging the variance values of the data segments to obtain a mean value V, and taking the mean value V of the variance values of the data segments as a threshold value, wherein V=mean (Var$_1$, Var$_2$, Var$_n$), where mean represents an average operation, n represents a number of the data segments, and Var represents the variance value;
4) Comparing the variance value of each of the data segments with the threshold value, and taking variance value features adjacent to the threshold value as anchor points of ASWs, wherein the variance value features correspond to an abnormal data development region R$_{in}$ and an abnormal data decline region R$_{out}$ respectively; and
5) Combining the anchor points of the ASWs in pairs to generate specific ASWs with different sizes, wherein data outside the abnormal data development region R$_{in}$ and the abnormal data decline region R$_{out}$ is regarded as normal data with a same attribute;
step 2: extracting time-domain statistical factors and frequency-domain statistical factors of each of the data segments to refine data information, thereby forming objects for study;
step 3: calculating an outlier degree of each of the objects by using a weighted multiscale local outlier factor (WMLOF) based on feature factors;
step 4: detecting anomalies in the SHM data by comparing an WMLOF value of each the object with the threshold value; and
step 5: eliminating data corresponding to the anomalies from the SHM data to obtain target SHM data, thereby performing fault diagnosis on mechanical equipment corresponding to the SHM data based on the target SHM data;
wherein in the step 3, the WMLOF is used to determine weights of local outlier factor (LOF) values under different nearest neighbors k, an entropy weight method (EWM) is used to perform weighting, and steps to calculate the weights are as follows:
step (i): determining an evaluation object matrix DT; wherein each row and column of the evaluation object matrix DT respectively represent an evaluation object and a LOF original feature corresponding to the evaluation object; in the evaluation object matrix DT, [p=1, 2, . . . , n; k=k$_{min}$, k$_{min+1}$, . . . , k$_{max-1}$, k$_{max}$]; n represents a number of the evaluation object; k∈ [k$_{min}$, k$_{max}$], k$_{min}$ and k$_{max}$ are 5 and 20 respectively;

$$DT = \begin{bmatrix} q_{1k_{min}} & q_{1k_{min}+1} & \cdots & q_{1k_{max}-1} & q_{1k_{max}} \\ q_{2k_{min}} & q_{2k_{min}+1} & \cdots & q_{2k_{max}-1} & q_{2k_{max}} \\ \cdots & \cdots & \cdots & \cdots & \cdots \\ q_{pk_{min}} & q_{pk_{min}+1} & \cdots & q_{pk_{max}-1} & q_{pk_{max}} \\ \cdots & \cdots & \cdots & \cdots & \cdots \\ q_{nk_{min}} & q_{nk_{min}+1} & \cdots & q_{nk_{max}-1} & q_{nk_{max}} \end{bmatrix}$$

step (ii): using normalization of indexes to normalize heterogeneous indexes, and using a linear normalization technique to render dataset of the evaluation object matrix DT dimensionless, thereby obtaining a NDM$_{pk}$ matrix through the following formula:

$$NDM_{pk} = \frac{q_{pk} - \text{Min}(q_k)}{\text{Max}(q_k) - \text{Min}(q_k)}$$

wherein q$_{pk}$ represents data of the evaluation object matrix DT corresponding to an evaluation object p under a k-th nearest neighbor, and q$_k$ represents data of the evaluation object matrix DT under the k-th nearest neighbor;

step (iii): obtaining an occurrence probability of a response Pr$_{pk}$ and calculating an entropy value of the response Pr$_{pk}$ by the following formulas:

$$Pr_{pk} = \frac{NDM_{pk}}{\sum_{p=1}^{n} NDM_{pk}}$$

$$En_k = -\frac{1}{\log_e(n)} \sum_{p=1}^{n} Pr_{pk} \log_e(Pr_{pk})$$

wherein En$_k$ represents the entropy value, and e represents a natural logarithm;

step (iv): calculating an information entropy redundancy Div$_k$ of each the response Pr$_{pk}$ and an entropy weight value Ew$_k$ of the information entropy redundancy Div$_k$ by the following formulas;

$$Div_k = |1 - En_k|$$

$$Ew_k = \frac{Div_k}{\sum_{k_{min}}^{k_{max}} Div_k}$$

wherein LOF results of each sample under the different nearest neighbors k are regarded as responses of different samples, and WMLOF of the evaluation object p is obtained by the following formula:

WMLOF$_p$=100×Ew(NDM$_p$)$^T$ where Ew represents an entropy weight value, and T represents a transposition operation.

2. The adaptive method of cleaning SHM data based on local outlier factor according to claim 1, wherein in the step 2, the time-domain statistical factors and the frequency-domain statistical factors comprise the feature factors, the features factors comprise: absolute mean, variance, standard deviation, kurtosis, skewness, root mean square, shape factor, peak factor, impulse factor, margin factor, kurtosis factor, clearance factor and mean frequency; and the feature factors are recombined to form low-latitude sample objects.

3. The adaptive method of cleaning SHM data based on local outlier factor according to claim 1, wherein the mechanical equipment comprises: at least one of a rolling bearing, a wind turbine, a gearbox, and a motor.

* * * * *